(12) United States Patent
Howard

(10) Patent No.: US 11,459,219 B1
(45) Date of Patent: Oct. 4, 2022

(54) AUTONOMOUS VEHICLE JACK SYSTEM

(71) Applicant: DeSean Stacy Howard, Marion, AL (US)

(72) Inventor: DeSean Stacy Howard, Marion, AL (US)

( * ) Notice: Subject to any disclaimer, the term of this patent is extended or adjusted under 35 U.S.C. 154(b) by 0 days.

(21) Appl. No.: 17/303,624

(22) Filed: Jun. 3, 2021

Related U.S. Application Data

(60) Provisional application No. 63/166,661, filed on Mar. 26, 2021.

(51) Int. Cl.
| | |
|---|---|
| *B66F 5/04* | (2006.01) |
| *B60S 11/00* | (2006.01) |
| *B66F 9/06* | (2006.01) |
| *B65G 1/04* | (2006.01) |

(52) U.S. Cl.
CPC ............... *B66F 5/04* (2013.01); *B60S 11/00* (2013.01); *B66F 9/063* (2013.01); *B65G 1/0492* (2013.01); *G05D 2201/0216* (2013.01)

(58) Field of Classification Search
CPC ...... B66F 5/04; B66F 5/00; B66F 3/00; B66F 3/005; B66F 2700/09; B66F 7/28; B66F 9/063; B66F 9/0755; B66F 7/0625; B60S 11/00; B60S 9/00; B60S 9/02; B60S 13/00; B25J 5/00; B25J 5/005; B25J 5/007; B62D 49/02; B65G 1/0492; B65G 1/1373; G05D 2201/0216
See application file for complete search history.

(56) References Cited

U.S. PATENT DOCUMENTS

| | | | |
|---|---|---|---|
| 4,743,037 | A | 5/1988 | Hanser |
| 4,746,133 | A | 5/1988 | Hanser et al. |
| 5,143,386 | A | 9/1992 | Uriarte |
| 5,188,379 | A | 2/1993 | Krause et al. |
| 5,312,119 | A | 5/1994 | Schneider et al. |
| 6,527,254 | B1 | 3/2003 | Prevete |
| 6,991,221 | B1 | 1/2006 | Rodriguez |
| 7,025,178 | B2 | 4/2006 | Wengelski et al. |
| 7,407,189 | B2 | 8/2008 | Hiebert et al. |
| 8,919,739 | B1 | 12/2014 | Romero et al. |
| 9,126,568 | B1 | 9/2015 | Reid, Jr. |
| 9,963,123 | B2 | 5/2018 | Dominguez et al. |
| 2007/0013537 | A1 | 1/2007 | Jones et al. |
| 2007/0210292 | A1 | 9/2007 | Zou et al. |

(Continued)

*Primary Examiner* — Mahdi H Nejad
(74) *Attorney, Agent, or Firm* — Dunlap Bennett & Ludwig, PLLC

(57) ABSTRACT

An autonomous jack system. The system provides an autonomous jack housed in a storage condition under a vehicle. The autonomous jack having an extensible jack arm pivotably connected to a body with a motive source and lockable tracks to exit its storage condition and traverse uneven terrain and lock its track at a point there along. The system embodies placing lift points along the underside of a vehicle, each lift point associated with a wheel that may need to be lifted off a supporting surface. The lift point includes an identifier that may send an indication of the lift point to the autonomous jack having sensors to read the indication and navigate the supporting surface. The lift point is identified through a computer-implemented control panel operated by a user. The jack arm terminates in a hand dimensioned and adapted to operatively associate with the identified lift point.

8 Claims, 3 Drawing Sheets

(56) References Cited

U.S. PATENT DOCUMENTS

| | | |
|---|---|---|
| 2016/0009256 A1 | 1/2016 | Dondurur et al. |
| 2016/0264106 A1 | 9/2016 | Pierre |
| 2017/0362068 A1* | 12/2017 | Cheng .................. B66F 7/0633 |
| 2019/0302787 A1* | 10/2019 | Li ........................ G06Q 10/087 |
| 2020/0156869 A1* | 5/2020 | Hu ....................... G05D 1/0225 |
| 2020/0269425 A1* | 8/2020 | Shikano ................. B25J 9/1679 |
| 2020/0317482 A1* | 10/2020 | Thomas ................... B60P 7/08 |
| 2020/0324976 A1* | 10/2020 | Diehr ............... G05B 19/41895 |
| 2020/0407206 A1* | 12/2020 | Bowers ..................... B66F 3/46 |
| 2021/0339993 A1* | 11/2021 | Matsuda .................. B66F 3/44 |

\* cited by examiner

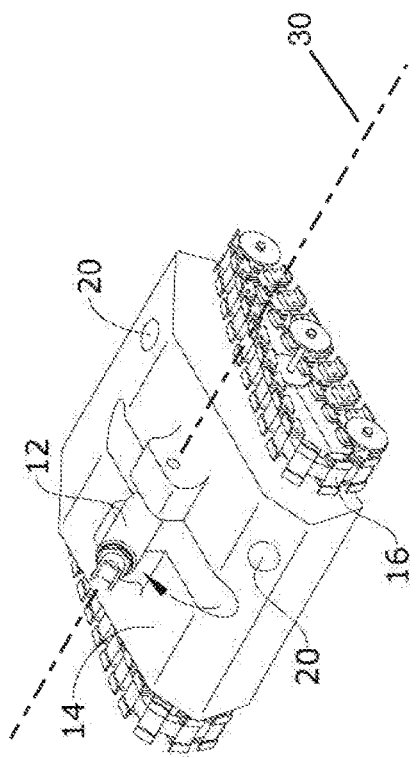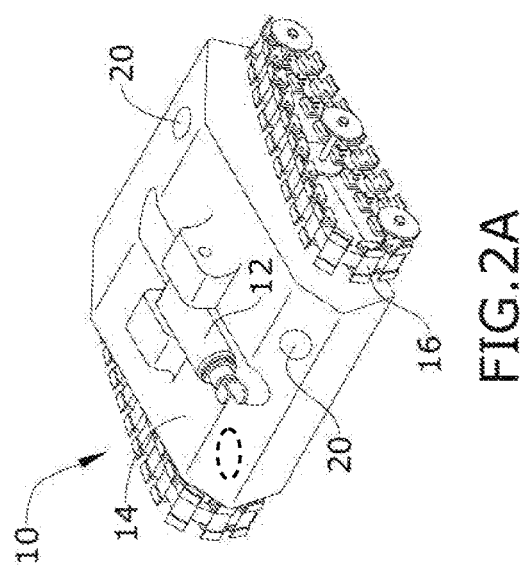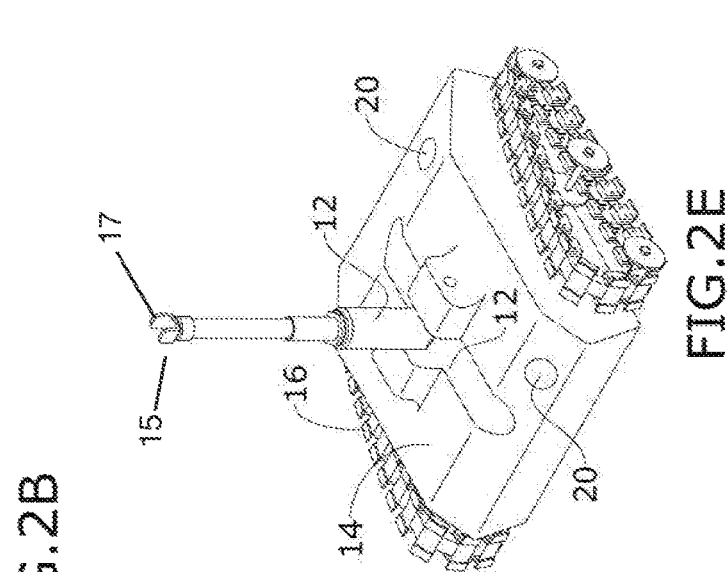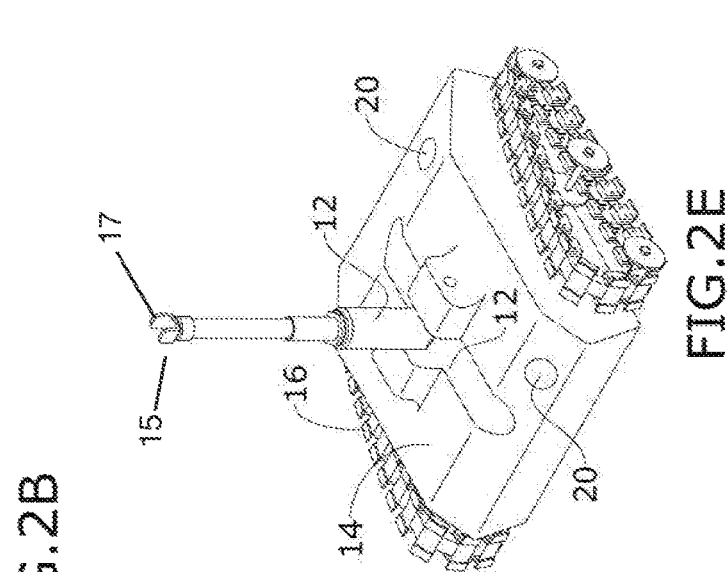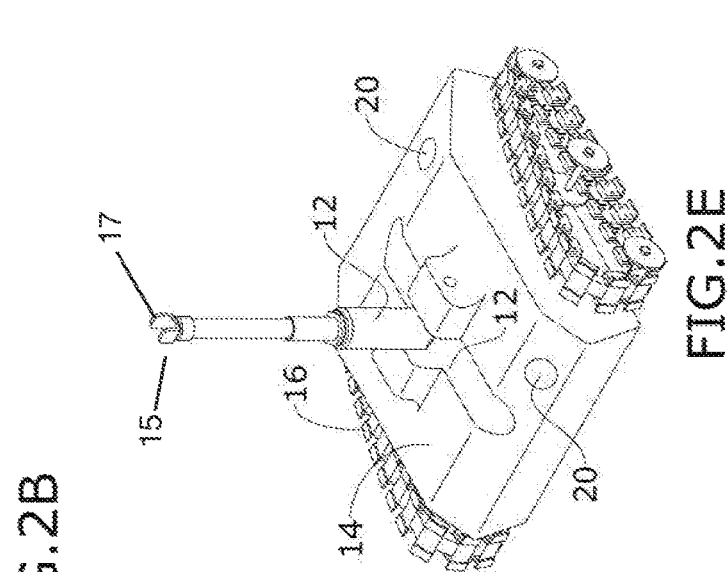

AUTONOMOUS VEHICLE JACK SYSTEM

CROSS-REFERENCE TO RELATED APPLICATION

This application claims the benefit of priority of U.S. provisional application No. 63/166,661, filed 26 Mar. 2021, the contents of which are herein incorporated by reference.

BACKGROUND OF THE INVENTION

The present invention relates to autonomous vehicles and, more particularly, an autonomous vehicular jack and a system embodying the same.

Using a vehicle jack properly is critical to efficiently and safely lifting a portion of a vehicle to, among other things, repair a flat tire. Manually operating a conventional portable jack may, however, be too strenuous for some people with physical limitations due to their age and/or health.

Conventional portable jacks can also be too cumbersome or awkward to crank, thereby resulting in an inefficient and possibly unsafe result. Furthermore, because of their rigid geometry, most portable jacks are difficult to properly engage the underneath of a vehicle along uneven terrain or when the support surface is not level, which can cause very unsafe conditions for those under or around such lifted vehicles. In short, using a conventional portable jack is time consuming, physically stressful on the back and knees, and potentially unsafe.

As can be seen, there is a need for an autonomous vehicular jack adapted to automatically raise a vehicle in seconds through a jack arm that is pivotably connected to a base, wherein the jack arm is selectively movable between a contracted position and an extended position, and wherein the base is adapted to be automatically traverse a variety of terrain types. On command, the autonomous jack will engage an underside of a vehicle, lift the vehicle, lower the vehicle, and then store itself away beneath the vehicle.

The present invention revolutionizes the way motorists can change flat tires by eliminating the guess work of jack placement. Time consumption, relative to the prior art, will be greatly reduced with the autonomous self-appointing jack. By self-appointing it is understood that the autonomous jack automatically identifies the relevant lift point and independently engages the correct lift point for lifting the vehicle, when instructed to do so. The lift points are electronic and structural components provided and attached to the underside of the vehicle prior to operation, wherein the lift points are structurally dimensioned and adapted to operatively associate with the lifting end of the actuating jack arm of the autonomous jack, thereby the present invention eliminates the guess work and trial and error aspect all too common in convention vehicle jacking systems. The autonomous jack may self-appoint itself on demand from an infotainment center inside the vehicle. The autonomous jack never has to be handled by the motorist, and there is no rotating jack handle. Last but least, the autonomous jack recharges in its compartment, after it automatically moves itself to a storage condition beneath the vehicle.

SUMMARY OF THE INVENTION

In one aspect of the present invention, an autonomous lifting system includes the following: one or more lift points associated with an underside of a vehicle; and an autonomous jack providing a body; and an extensible jack arm pivotably connected to the body, the extensible jack arm being dimensioned to operatively associate with each lift point, the autonomous jack having a motive source.

In another aspect of the present invention, the autonomous lifting system further includes one or more continuous tracks operatively associated with the body, wherein the one or more continuous tracks are lockable; one or more guiding sensors operatively associated with the one or more continuous tracks; an identifier associated with each lift point, wherein each identifier is readable by the one or more guiding sensors; a computer-implemented control panel configured to identify one of the one or more lift point, thereby activating the associated identifier, wherein the autonomous jack is movable to a storage condition physically associated along the vehicle; a hand at a distal end of the extensible jack arm, wherein the hand is operatively associate with each lift point, wherein the hand has two spaced apart flanges.

These and other features, aspects and advantages of the present invention will become better understood with reference to the following drawings, description and claims.

BRIEF DESCRIPTION OF THE DRAWINGS

FIG. 2A is a perspective view of an exemplary embodiment of the present invention, shown in a contracted, un-pivoted storage condition;

FIG. 2B is a perspective view of an exemplary embodiment of the present invention, illustrating a jack arm pivotably moving about an axis of rotation 30;

FIG. 2C is a perspective view of an exemplary embodiment of the present invention, illustrating the jack arm in a contracted condition;

FIG. 2D is a perspective view of an exemplary embodiment of the present invention, illustrating the jack arm extending to the fully extended position;

FIG. 2E is a perspective view of an exemplary embodiment of the present invention, illustrating a fully extended position of the jack arm.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an autonomous jack system. The system provides an autonomous jack having an extensible jack arm pivotably connected to a body with a motive source 44 and lockable tracks to traverse uneven terrain and lock its track at a point there along. The system embodies placing lift points along the underside of a vehicle, each lift point associated with a wheel that may need to be lifted off a supporting surface. The lift point includes an identifier that sends an indication of the lift point to the autonomous jack having sensors to reach the indication and navigate the supporting surface. The jack arm terminates in a hand dimensioned and adapted to operatively associate with a lift point that is associated with a wheel identified through a computer-implemented control panel operated by a user.

Figure 1:
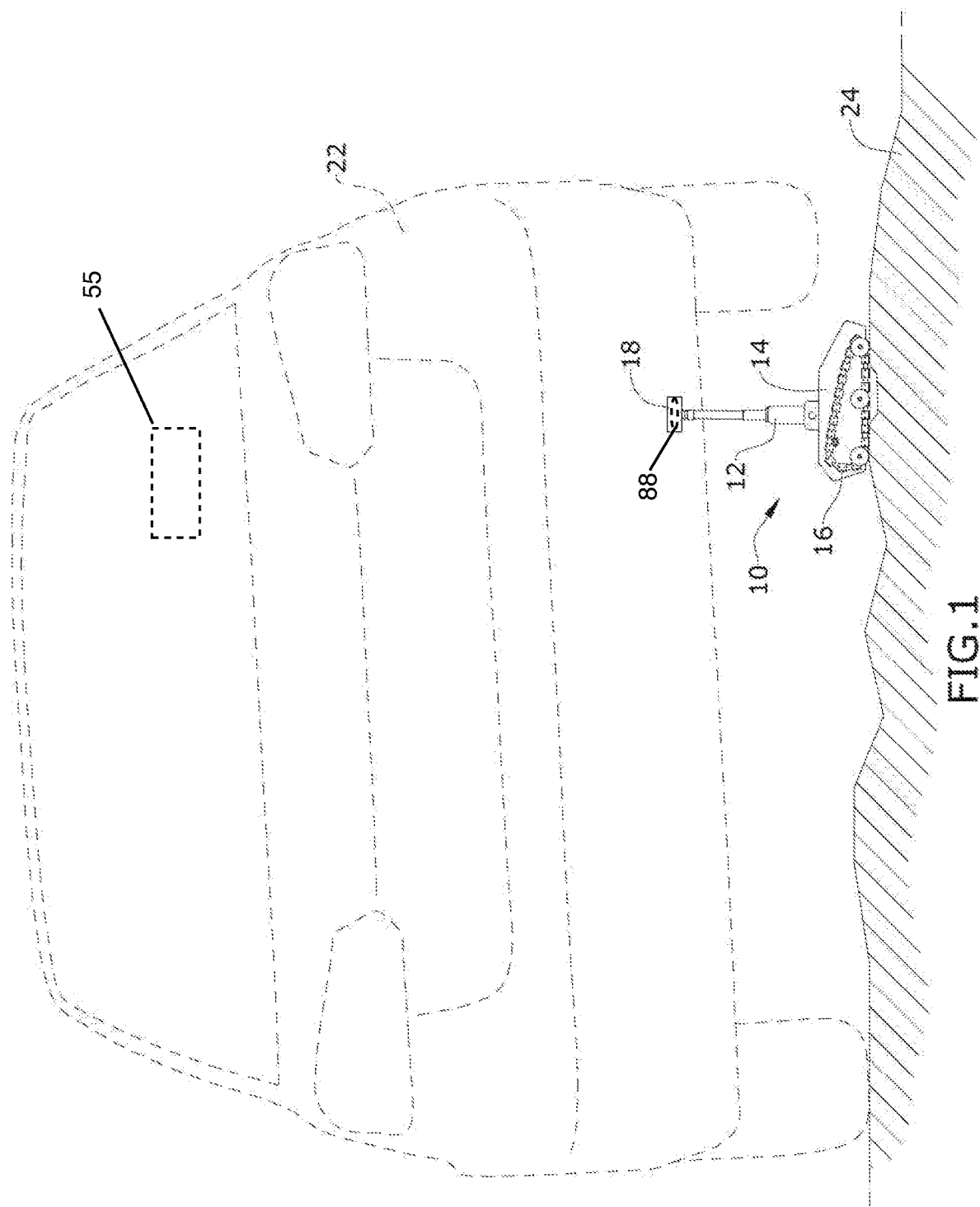
FIG. 1 is a perspective view of an exemplary embodiment of the present invention, shown in use.

It should be understood by those skilled in the art that the use of directional terms such as upper, lower and the like are used in relation to the illustrative embodiments as they are depicted in the figures, the upper direction being toward the top margin of the FIG. 1, and the lower (underside) direction being toward the bottom of FIG. 1.

Figure 3:
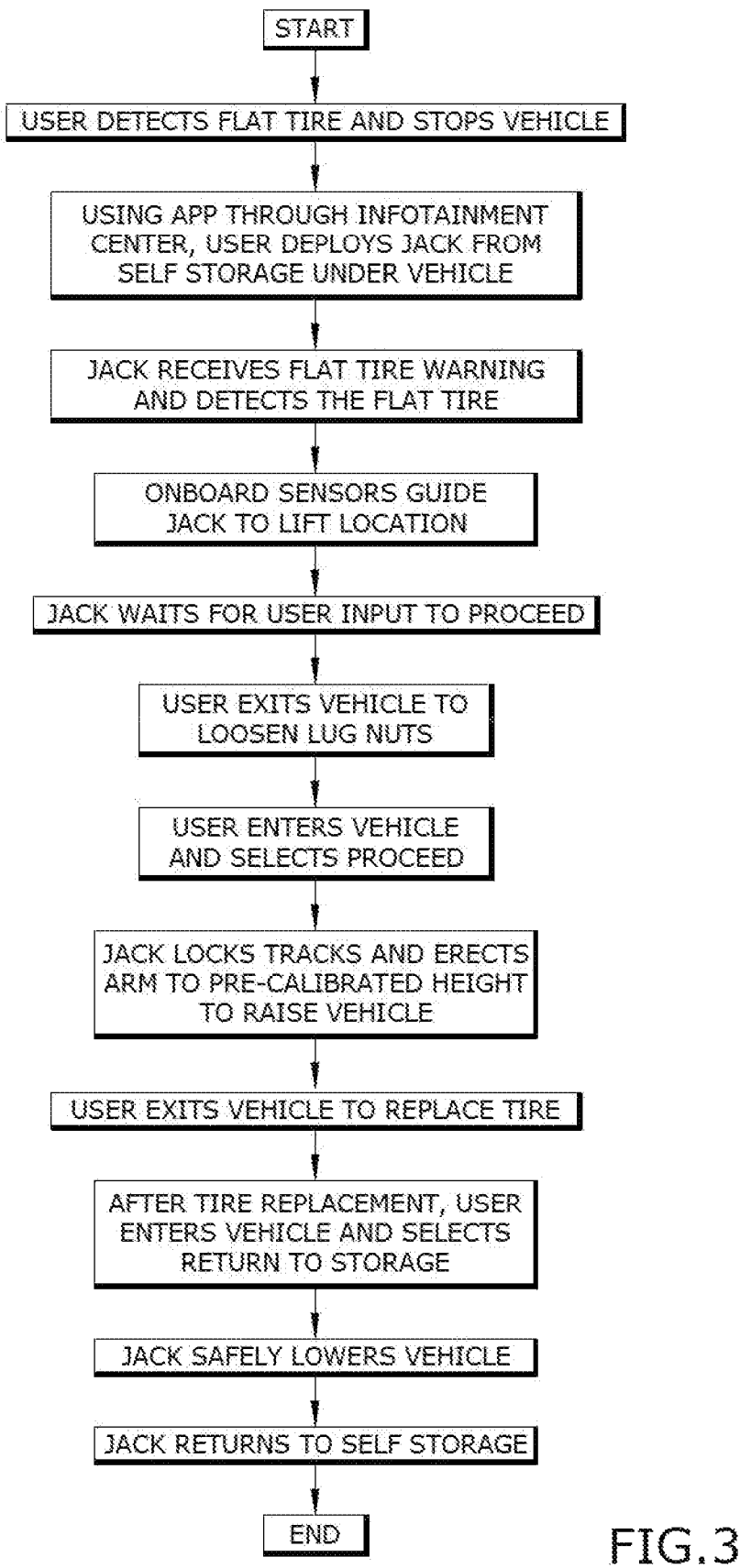
FIG. 3 is a flow chart of an exemplary embodiment of the present invention.

Referring now to FIGS. 1 through 3, the present invention may include an autonomous vehicular jack 10. The autonomous vehicular jack 10 has a body 14 operatively associated with a jack arm 12. The jack arm 12 is pivotably connected to an upper portion of the body 14 so as to rotate along at least one axis of rotation 30. The jack arm 12 is selectively movable between a contracted position and an extended position, as illustrated in FIG. 2C through FIG. 2E. A distal end of the jack arm 12 may include a hand 15 defined by two spaced apart flanges 17 generally parallelly disposed relative to each other. The hand 15 may be adapted to swivel about the distal end of the jack arm 12. The autonomous programmed jack arm 12 may be pneumatic or hydraulic in nature.

The body 14, along a lower portion thereof, may have lockable tracks 16 for traversing a variety of uneven terrains 24. The body 14 may provide one or more guiding sensors 20 for autonomously analyzing the terrain 24 and the underside of a vehicle 22 in order to determine and engage one or a plurality of lift points 18 along an underside of the vehicle 22, as illustrated in FIG. 1.

The present invention may include a computer-implemented control panel 55. The control panel 55 may be embodied in the vehicle 22 as part of, in certain embodiments, an infotainment center or command center (not shown) or may be represented on a user interface of a mobile device. The underside of the vehicle 22 may provide an identifier 88 associated with the lift point 18 along the underside of the vehicle 22. The identifier 88 and the lift point 18 may be one in the same. The identifier 88 may be configured to send an indication of the lift point 18, wherein the guiding sensors 20 on the body 14 of the autonomous jack 10 automatically receives, identifies and tracks the relevant lift point 18. In certain embodiments, the identifier 88 may active or passive, and have a transponder, a receiver and a transmitter of electromagnetic waves, wherein the guiding sensors 20 may include a reader device for electromagnetically interrogating the identifier 88. There may be a lift point 18 for each wheel of the vehicle 18 as well as for points along the underside of the vehicle 22 to lift the entire front or rear thereof. Each lift point 18 may provide physical structure that is dimensioned and adapted to operatively associate with the hand 15.

The autonomous lift 10 may be controlled via the computer-implemented control panel and/or a software application enabling orders to be transmitted to and received by the autonomous lift 10. The body 14 may be fitted with brakes, rubber matted tracks 16, a microprocessor, a gyroscope and/or other position guidance elements, and in some embodiments a fiber optic visual aid.

Referring to FIG. 3, a method of using the present invention may include the following. The autonomous lift 10 disclosed above may be provided. A user may detect a flat tire and stop the vehicle 22. Employing the computer-implemented control panel, the user deploys the autonomous lift 10 from a self-storage condition (not shown) under the vehicle 22 by specifying the flat tire (among a plurality of tires). The autonomous lift 10 receives the flat tire warning, then detects the lift point 18 associated with the specified flat tire; and the onboard guiding sensors 20 guide the autonomous lift 10 to the associated lift point 18. In certain embodiments, the autonomous lift 10 then waits for user input to proceed. The user exits vehicle 22 to loosen lug nuts. User then enters the vehicle 22 and selects proceed. The autonomous lift 10 then locks its tracks 16 and pivots and extends the jack arm 12 to a pre-calibrated height based on the reading of the associated lift point 18, engages the lift point 18 and raises the vehicle 22. The user exits the vehicle 22 to replace the tire. After tire replacement, the user enters the vehicle and selects return to the storage condition, at which time the autonomous lift 10 then lowers the vehicle 22 safely, and then returns to the storage condition and recharges if necessary.

Many motorists catch a flat tire sooner or later. The present invention will eliminate time consuming handling of a portable jack. Some motorists find it difficult to properly appoint the portable jack and find it even more mentally aggravating and physically stressful to try and crank the handle of a portable jack. These compilations will be eliminated by the present invention. The autonomous lift 10 will be proportionate to prescribed vehicle. Additionally, the present invention will have a wide array of uses throughout the transportation and construction industries, with a long-range goal of providing safe emergency rescue solutions.

It should be understood, of course, that the foregoing relates to exemplary embodiments of the invention and that modifications may be made without departing from the spirit and scope of the invention as set forth in the following claims.

What is claimed is:

1. An autonomous lifting system for a passenger vehicle, comprising:
   one or more lift points associated with an underside of the passenger vehicle; and
   an autonomous jack comprising:
   a body comprising a curved cutout formed along an upper portion of the body;
   an extensible jack arm pivotably connected to the body, the extensible jack arm being dimensioned to operatively associate with each lift point, the autonomous jack having:
   a power source to traverse a terrain;
   one or more guiding sensors operatively associated with the power source;
   wherein the extensible jack arm is cylindrical and telescoping, the extensible jack arm extending from a distal end to a proximal end; and
   a pivot point connecting the proximal end to the body so that the extensible jack arm moves between a storage position and one of a plurality of operable positions, where in the storage position an entirety of the extensible jack arm is adjacent the curved cutout; and
   an identifier physically associated with each lift point, wherein each identifier is readable by the one or more guiding sensors in such a way that the autonomous jack detects, moves to, and physically engages the one or more lift points with the extensible jack arm.

2. The autonomous lifting system of claim 1, further comprising one or more continuous tracks operatively associated with the body.

3. The autonomous lifting system of claim 2, wherein the one or more continuous tracks are lockable.

4. The autonomous lifting system of claim 3, wherein the body is dimensioned to traverse under the passenger vehicle while the passenger vehicle is directly supported by the terrain.

5. The autonomous lifting system of claim 4, further comprising a computer-implemented control panel configured to identify one of the one or more lift point, thereby activating the associated identifier.

6. The autonomous lifting system of claim 5, wherein the autonomous jack is movable to a storage condition physically associated along the underside of the passenger vehicle, where in the stored condition the autonomous jack is not supported by the terrain.

7. The autonomous lifting system of claim 6, further comprising a hand at the distal end of the extensible jack arm, wherein the hand is operatively associable with each lift point.

8. The autonomous lifting system of claim 7, wherein the hand has two spaced apart flanges.

\* \* \* \* \*